April 2, 1940.  J. W. CUMBUS ET AL  2,195,619
HYDRAULIC CLUTCH
Filed July 6, 1937
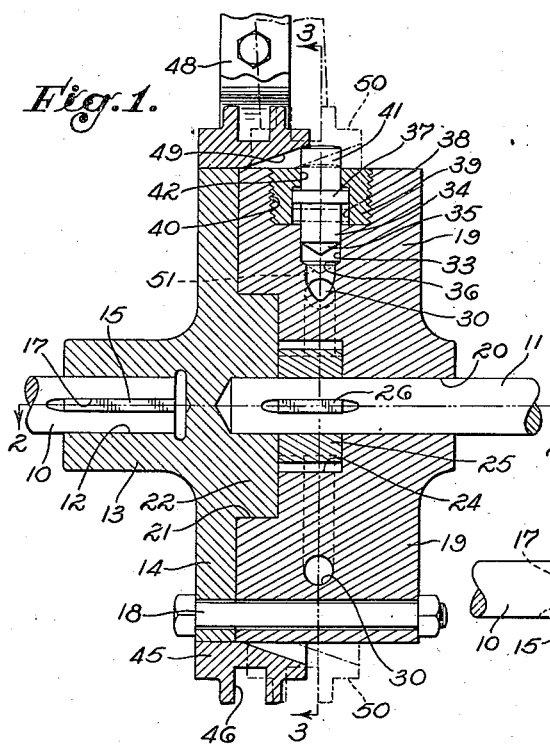
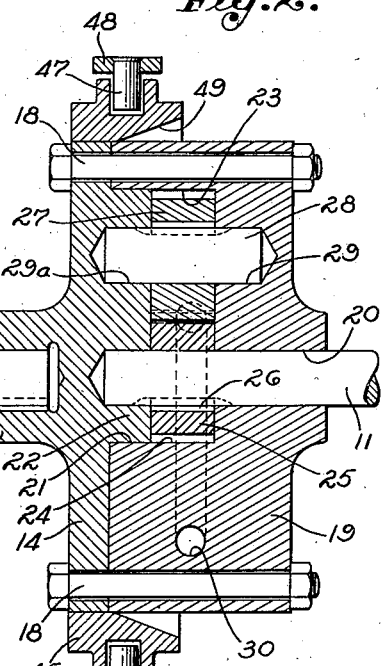
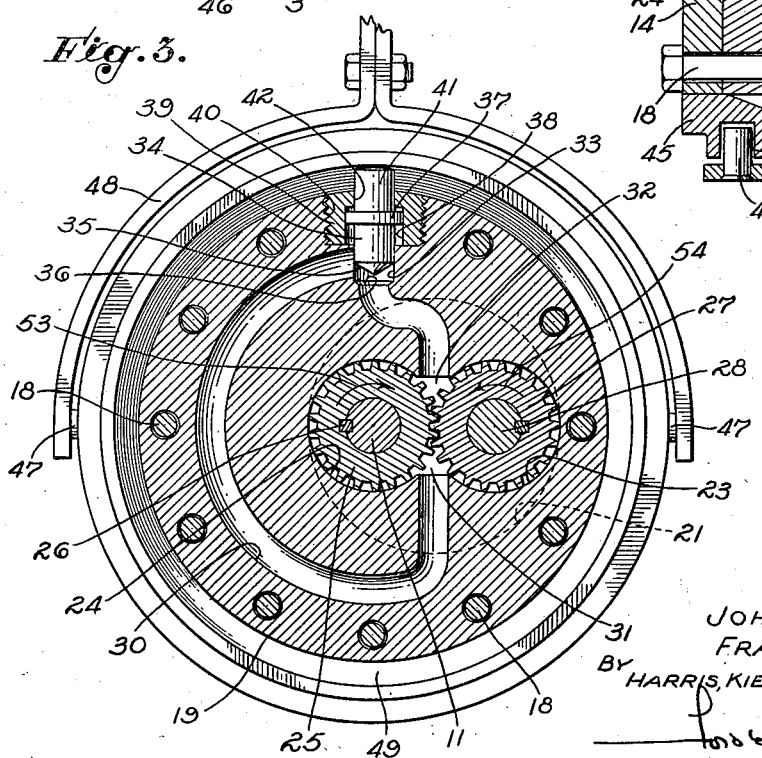
INVENTORS
JOHN W. CUMBUS
FRANK D. TRUSS
BY HARRIS, KIECH, FOSTER & HARRIS
ATTORNEYS.

Patented Apr. 2, 1940

2,195,619

UNITED STATES PATENT OFFICE 2,195,619

HYDRAULIC CLUTCH

John W. Cumbus, Beverly Hills, and Frank D. Truss, Los Angeles, Calif.

Application July 6, 1937, Serial No. 152,134

6 Claims. (Cl. 192—61)

Our invention relates to the clutch art, and more particularly to a clutch mechanism which is adapted to control the relative movement of two rotating elements.

The invention is of particular utility in the automotive industry and will be described in connection with its preferred use therein, but it is to be understood that the invention has other uses and we do not intend to limit ourselves in any way to the use described.

The invention may preferably be used as a simple clutch for making or breaking connection between two rotating elements such as a drive shaft and a driven shaft, and, accordingly, it is a primary object of our invention to provide a novel form of clutch of such type.

We have found that by means of suitable intermediate control our invention may be used as a transmission to provide any desired rotation ratio between a drive shaft and a driven shaft, and it is therefore another object of the invention to provide a transmission of such character.

Other objects and advantages will appear from the following specification and claims.

In the drawing:

Fig. 1 is a view, partly in section, of the invention taken in elevation.

Fig. 2 is a view, partly in section, taken on the line 2—2 of Fig. 1.

Fig. 3 is a view, partly in section, taken on the line 3—3 of Fig. 1.

Referring to the drawing, we show a driven shaft 10 which may be connected to any desired device to be driven, such as an automobile differential (not shown), and a drive shaft 11 which may be connected to any desired source of power, such as an automobile engine (not shown). The driven shaft 10 projects into a bore 12 of a hub 13 formed on a circular plate member 14, the driven shaft being rigidly fixed to the hub by means of a key 15 projecting into a slot 16 formed in the hub and a keyway 17 formed in the driven shaft. The circular plate member 14 is fixed by means of suitable bolts 18 to a circular housing member 19 which is preferably of the same diameter as the plate member.

The housing member 19 is provided with a central bore 20, which is axially aligned with the bore 12 and which journals the drive shaft 11. The housing member 19 also has a circular counterbore 21 axially offset from the axis of the drive shaft 11 and adapted to receive a plug 22 formed on the inner side of the circular plate 14, the plug having a close fluid-sealing fit with the counterbore 21. Formed in the housing member 19 and eccentric to the axis of the counterbore 21 are gear chambers 23 and 24 which intersect on the axis of the counterbore. The gear chamber 24 contains a drive gear 25 which is fixed on the drive shaft 11 by means of a suitable key and keyways 26 and which has a close fit with the walls of the gear chamber. Meshing with the drive gear 25 is an idling gear 27 retained in the gear chamber 23 and having a close fit with the walls thereof, the idling gear being suitably fixed to a stub shaft 28 journalled in stub shaft bores 29 and 29a formed in the housing member 19 and the plate member 14, respectively. The stub shaft 28 and idling gear 27 are freely rotatable relative to the housing member 19 and plate member 14, so that rotation of the drive shaft 11 may rotate the idling gear through rotation of the drive gear 25.

Also formed in the housing member 19 is a fluid passage 30 which connects one side of the gear chambers 23 and 24 at an inlet point 31 with the other side of the gear chambers at an outlet point 32. In the line of the fluid passage 30 is a cylindrical valve chamber 33 receiving a cylindrical valve member 34 having a tapered head 35 adapted to seat in a seat 36 provided at the inner end of the valve chamber. The valve member 34 has an enlarged shoulder portion 37 journalled in a counterbore 38 in a threaded plug 39 threadedly received in an opening 40 in the exterior of the housing member 19. The valve member 34 also has an outer portion 41 which projects through a control opening 42 in the threaded plug 39. It will be noted that the valve member 34 may move from an inner seated position in which the tapered head 35 is seated in the seat 36 to an outer position in which the outer portion 41 of the valve member projects beyond the periphery of the housing member 19, the shoulder portion 37 acting as a stop to limit the outward movement of the valve member, as shown in Fig. 1. When the valve member 34 is in its inner position and seated on the seat 36, the fluid passage 30 is closed, and when the valve member is in its outer position, as shown in Figs. 1 and 3, the fluid passage is open and fluid may flow therethrough.

The lower end of the valve member 34 may be considered as a valve means which in its movement varies the cross-sectional area of the passage 30, and the upper end 41 of the valve member 34 may be considered as a radially-movable valve operating means. In the construction shown in the drawing, the valve means and valve operating means are shown integrally combined in one metallic part, but, while this is the preferable and simplest arrangement, the valve means may be mounted to move in directions other than radial, provided only it is adapted to vary the cross-sectional area of the passage 30.

Slidable on the outer peripheries of the plate member 14 and the housing member 19 is a ring 45 having an annular channel 46 adapted to receive lugs 47 of a yoke 48, the inner end of the ring having an inwardly bevelled portion 49 adapted to engage the outer portion 41 of the valve member 34. It will be understood that the yoke 48 can be actuated to move the ring 45 to the position shown in dotted lines 50 in Fig. 1, in which the valve member 34 is fully seated as shown in dotted lines 51, or the ring can be moved so as to provide any desired degree of closure of the valve member.

In operation, the device is assembled as shown, the fluid passage 30 and the gear chambers 23 and 24 being filled with oil or other liquid prior to insertion of the threaded plug 39. With the yoke 48 in the position shown in Fig. 1, the fluid passage 30 is fully opened and liquid may flow from the chambers 23 and 24 at the outlet point 32 through the fluid passage to the inlet point 31 and again into the gear chambers. Rotation of the drive shaft 11 in a clockwise direction, as indicated by the arrow 53, will rotate the drive gear 25 fixed thereon. Rotation of the drive gear 25 in a clockwise direction will cause the idling gear 27 to rotate in a counterclockwise direction, as indicated by the arrow 54, and liquid at the inlet point 31 will be carried between and by the teeth of the gears around the gear chambers in the same directions as the rotation of the gears to the outlet point 32 from which the liquid will flow through the fluid passage 30, past the open valve member 34 which is assumed to be in its outer position, back to the inlet point 31. Thus, the idling gear 27 will rotate on its stub shaft 28, and the housing member 19 and plate member 14 and connected driven shaft 10 will not move. The gears 25 and 27 and the teeth thereof make substantially fluid-tight fits with the walls of the gear chambers 24 and 23, respectively, and rotation of the gears as described causes them to operate as a gear pumping device, as is well known in the art, to pump liquid from the inlet point 31 to the outlet point 32 through the gear chambers.

When it is desired to rotate the driven shaft 10 in approximately a one-to-one ratio with the drive shaft 11, the yoke 48 is actuated, manually or otherwise, to move the ring 45 inwardly to the position shown in dotted lines 50 in Fig. 1. During such inward movement of the ring 45, the bevelled portion 49 increasingly depresses the valve member 34 until the valve member is fully seated on the seat 36, at which time the flow of liquid through the fluid passage 30 is entirely shut off. As the valve member 34 is closed, the fluid pressure at the outlet point 32 and in the fluid passage 30 between the outlet point and the valve seat 36 rises. The rise of fluid pressure at the outlet point 32 exerts a retarding force on the teeth of the drive gear 25 and on the teeth of the idling gear 27, the retarding fluid force acting on the drive gear in a counterclockwise direction and on the idling gear in a clockwise direction. As soon as the rotation of the idling gear 27 relative to the housing member 19 and plate member 14 is thus retarded, the housing member and plate member rotate as a unit to rotate the driven shaft 10. As soon as the valve member 34 is fully seated on the seat 36, the fluid pressure at the outlet point 32 increases to a value at which the drive gear 25 and idling gear 27 can no longer rotate relative to the housing member 19, and the housing member, plate member 14, and driven shaft 10 rotate with the drive shaft 11 in substantially a one-to-one relation. It will be recognized that in a commercially operable device of the type described herein, friction and slight liquid leakage past the drive and idling gears 25 and 27 will frequently cause some slight relative movement of the drive and driven shafts 11 and 10, but it is to be understood that such manner of operation is within the spirit of our invention.

By adjusting the ring 45 intermediate between its full and dotted line positions shown in Fig. 1, any desired degree of closure of the valve member 34 may be accomplished to build up any desired retarding fluid pressure on the teeth of the gears 25 and 27 at the outlet point 32. As soon as the retarding fluid pressure at the outlet point 32 overcomes the inertia and friction of the housing member 19 and its associated parts, including the driven shaft 10, the housing member and driven shaft will start to rotate at relatively slow speed relative to the rotational speed of the drive shaft 11, the fluid pressure acting as a fluid or hydraulic brake between the drive and driven shafts. By adjusting the degree of closure of the valve member 34, this fluid braking action can be varied to any desired extent to provide any desired ratio of rotation between the drive and driven shafts 11 and 10, from zero to one. It will thus be understood that the invention may be used as a transmission to provide any desired ratio of rotation between a drive shaft and a driven shaft, which is an important feature of the invention. When the ring 45 is moved towards its full line position shown in Fig. 1, fluid pressure at the outlet point 32 and in the fluid passage 30 between the outlet point and the valve member 34 will act on the tapered head 35 to move the valve member outwardly to its outer position shown in full lines in Fig. 1, to open the valve. Thus, it will be observed that the valve member 34 is assured of positive action in both opening and closing movements, which is a feature of the invention.

It will also be understood that although we describe the drive shaft 11 as being connected with a source of power, and the driven shaft 10 as being connected to a device to be driven, these connections may be reversed without departing from the invention, since in some cases it is immaterial which shaft operates as a drive shaft or driven shaft.

Although we have shown and described our invention in its preferred embodiment and in an extremely simplified form for clarity in description, it is to be recognized that we do not intend to be limited to the specific form disclosed but are entitled to the full scope of the following claims.

We claim as our invention:

1. In a device of the character described, the combination of: a drive shaft; a driven shaft; housing means fixed on one of said shafts; a fluid pump structure adapted to pump fluid when said housing means rotates with respect to said other shaft; walls defining a fluid passage in said housing means connecting the inlet and outlet of said fluid pump structure; a valve means adapted to vary the effective cross sectional area of said passage; a valve operating means mounted in said housing to have radial movement with respect thereto and projecting from said housing; and a control member movable axially with respect to said housing and provided with a beveled face adapted to contact and move radially inwardly said valve operating means.

2. In a device of the character described, the combination of: a drive shaft; a driven shaft; housing means fixed on one of said shafts; a fluid pump structure adapted to pump fluid when said housing means rotates with respect to said other shaft; walls defining a fluid passage in said housing means connecting the inlet and outlet of said fluid pump structure; a valve means mounted to vary the effective cross sectional area of said passage and adapted to be opened by the pressure of the fluid in said passage; and an operating means for said valve means adapted to transmit energy to close said valve means, but ineffective to transmit energy to open said valve means.

3. In a device of the character described, the combination of: a drive shaft; a driven shaft; housing means fixed on one of said shafts and having a gear chamber therein; a first gear fixed to the other of said shafts and disposed in said chamber; a second and planetary gear in said chamber meshing with said first gear and rotatably supported by said housing, said first and second gears and said gear chamber constituting a rotary pump; walls defining a fluid passage in said housing means connecting opposite sides of said gear chamber; a radially movable valve member in said housing adapted at its inner end to project into the said passage and vary the effective cross sectional area thereof, and to be urged outwardly by the pressure of the fluid in said passage, and projecting at its outer end without said housing; and a control member outside said housing and mounted thereon to move transversely of said outer end of said valve member, and provided with a face adapted to have sliding contact with said outer end of said valve member and to urge said valve member inwardly against the pressure of said fluid.

4. In a device of the character described, the combination of: a drive shaft; a driven shaft; housing means fixed on one of said shafts and having a gear chamber therein; a first gear fixed to the other of said shafts and disposed in said gear chamber; a second and planetary gear in said gear chamber meshing with said first gear and rotatably supported by said housing, said first and second gears and said gear chamber constituting a rotary pump; walls defining a fluid passage in said housing means connecting opposite sides of said gear chamber, said housing being formed with a valve chamber extending from the outer circumferential face of said housing to and communicating with said passage; a radially movable valve member snugly fitting within said valve chamber and projecting into said passage at one end and projecting without said housing at the other end; and a control means movably mounted externally on said housing and provided with a face inclined to the axis of said housing and adapted to have sliding contact with the outer end of said valve member.

5. In a device of the character described, the combination of: a drive shaft; a driven shaft; housing means fixed on one of said shafts; a fluid pump structure adapted to pump fluid when said housing means rotates with respect to said other shaft; walls defining a fluid passage in said housing means connecting the inlet and outlet of said fluid pump structure; a radially movable valve member in said housing adapted at its inner end to project into the said passage and vary the effective cross sectional area thereof and to be urged outwardly by the pressure of the fluid in said passage, and projecting at its outer end without said housing; and a control member outside said housing and mounted thereon to move transversely of said outer end of said valve member, and provided with a face adapted to have sliding contact with said outer end of said valve member and to urge said valve member inwardly against the pressure of said fluid.

6. In a device of the character described, the combination of: a drive shaft; a driven shaft; housing means fixed on one of said shafts; a fluid pump structure adapted to pump fluid when said housing means rotates with respect to said other shaft; walls defining a fluid passage in said housing means connecting the inlet and outlet of said fluid pump structure, said housing being formed with a valve chamber extending from the outer circumferential face of said housing to and communicating with said passage; a radially movable valve member snugly fitting within said valve chamber and projecting into said passage at one end and projecting without said housing at the other end; and a control means movably mounted externally on said housing and provided with a face inclined to the axis of said housing and adapted to have sliding contact with the outer end of said valve member.

JOHN W. CUMBUS.
FRANK D. TRUSS.